US008200816B2

(12) United States Patent
Izrailevsky et al.

(10) Patent No.: US 8,200,816 B2
(45) Date of Patent: *Jun. 12, 2012

(54) ACCELERATED AND REPRODUCIBLE DOMAIN VISITOR TARGETING

(75) Inventors: Yury A. Izrailevsky, Hayward, CA (US); Anand Biligiri Subba Rao, Santa Clara, CA (US); Ramkumar Rajendran, Redmond, WA (US); Sunil Nagaraj, Sunnyvale, CA (US); Nanda Kumar Jayakumar, Santa Clara, CA (US); Georgiy Goldenberg, Palo Alto, CA (US); Joonsuk Bae, Menlo Park, CA (US); Kian-Tat Lim, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/217,085

(22) Filed: Aug. 24, 2011

(65) Prior Publication Data

US 2011/0307579 A1 Dec. 15, 2011

Related U.S. Application Data

(63) Continuation of application No. 12/544,966, filed on Aug. 20, 2009, now Pat. No. 8,028,065, which is a continuation of application No. 11/697,255, filed on Apr. 5, 2007, now Pat. No. 7,606,897.

(51) Int. Cl.
*G06F 15/173* (2006.01)

(52) U.S. Cl. ........ 709/224; 709/201; 709/203; 709/204; 709/245; 709/238; 709/255; 709/217; 715/234; 715/240; 715/255; 715/760

(58) Field of Classification Search .................. 709/217, 709/224, 203, 204, 225
See application file for complete search history.

(56) References Cited

U.S. PATENT DOCUMENTS

| 6,292,494 | B1 | 9/2001 | Baker |
| 7,606,892 | B2 | 10/2009 | Piet et al. |
| 7,606,897 | B2 * | 10/2009 | Izrailevsky et al. ........... 709/224 |
| 7,979,791 | B2 * | 7/2011 | Yang et al. .................... 715/234 |
| 8,028,065 | B2 * | 9/2011 | Izrailevsky et al. ........... 709/224 |

(Continued)

OTHER PUBLICATIONS

"Web Bug," Wikipedia, http://en.wikipedia.org/wiki/Web_bug, accessed Mar. 15, 2007.

(Continued)

*Primary Examiner* — Jude Jean Gilles
(74) *Attorney, Agent, or Firm* — Frommer Lawrence & Haug LLP; Jamie L. Wiegand

(57) ABSTRACT

A device, system, and method are directed towards managing and tracking of cross-domain user activities through use of a beacon. As a user of a client device requests content from different domain services managed by a common entity, they may receive a Uniform Resource Locator (URL) to a beacon in at least one of the different domains. In one embodiment, the beacon is a single pixel image. The client device may also receive a Match-ID. A beacon server in one of the other domains may receive the request for the beacon, and store in a domain log the Match-ID, and other information about the client device, which domain service provided the URL, and/ or other related user activities. The different domain logs may then be employed for use in searching for matching Match-IDs, joining common user or client device activities, and for tracking other cross-domain user activities.

20 Claims, 5 Drawing Sheets

U.S. PATENT DOCUMENTS

2004/0240411 A1 12/2004 Suzuki
2008/0082380 A1 4/2008 Stephenson
2008/0114897 A1 5/2008 Awadallah et al.

OTHER PUBLICATIONS

"The Web Bug FAQ," Electronic Frontier Foundation, http://www.eff.org/Privacy/Marketing/web_bug.html, accessed Mar. 15, 2007.
"Transmission Control Protocol," Internet Engineering Task Force, http://www.ietf.org/html/rfc793, accessed Mar. 15, 2007.
Kristol, D. et al., "HTTP State Management Mechanism," Feb. 1997, 20 pages, Bell Laboratories, Lucent Technologies and Netscape Communications, http://www.ietf.org/rfc/rfc2109.txt, accessed Jul. 5, 2007.
Fielding, R. et al., "Hypertext Transfer Protocol—HTTP/1.1," Jun. 1999, 165 pages, http://www.ietf.org/rfc/rfc2616.txt, accessed Jul. 5, 2007.
Office Communication for U.S. Appl. No. 11/697,255 mailed Feb. 24, 2009.
Office Communication for U.S. Appl. No. 11/697,255 mailed Jul. 31, 2009.
Office Communication for U.S. Appl. No. 12/544,966 mailed Sep. 2, 2010.
Office Communication for U.S. Appl. No. 12/544,966 mailed Dec. 28, 2010.
Office Communication for U.S. Appl. No. 12/544,966 mailed May 27, 2011.

* cited by examiner

| Byte Range | Name | Description |
|---|---|---|
| 0-0 | Version | |
| 1-4 | Server IP Address | Primary, or Request's host IP |
| 5-8 | Source Timestamp | Starting time of Request |
| 9-11 | Process ID | ID of Server Process |
| 12-13 | Sequence Number | Sequence No. for each Server Process. |
| 14-17 | Source Page ID | Page, Template ID. |

FIG. 3

ACCELERATED AND REPRODUCIBLE DOMAIN VISITOR TARGETING

CROSS-REFERENCE TO RELATED APPLICATIONS

This is a continuation of U.S. patent application Ser. No. 12/544,966, entitled "Accelerated And Reproducible Domain Visitor Targeting,", filed Aug. 20, 2009, which in turn is a continuation of U.S. patent application Ser. No. 11/697,255, entitled "Accelerated And Reproducible Domain Visitor Targeting,", filed Apr. 5, 2007, and claims the benefits of each, at least under 35 U.S.C. §120 and 37 C.F.R. §1.78, which are further incorporated herein by reference in their entirety.

FIELD OF THE INVENTION

The present invention relates generally to network communications' metrics and, more particularly, but not exclusively to managing and tracking of cross-domain user activities using a beacon.

BACKGROUND OF THE INVENTION

According to some studies, the volume of digital information over a wireless network is expected to continue to increase over the coming years. This may not be so surprising considering that more people are using their mobile devices, and other client devices, to communicate data over networks, to make purchases, to search for information, and to network with friends, family, and so forth.

As people use the internet they may frequent different internet domain services. Some of these internet domain services may be managed by a common entity, such as a business, individual, or the like. However, for a variety of reasons, including, for example, legal reasons, marketing reasons, name recognition reasons, logistics, or the like, such commonly managed services may be structured within different internet domains. Different internet domains may be recognized, because they do not share a common part of an Internet Protocol (IP) address, often observed by differing domain names. Thus, for example, a domain server may have an internet domain name reference, or Uniform Resource Locator (URL), of http://www.domain1.com. Such reference URL indicates that the domain server may be considered to reside within the domain named domain1.com. Similarly, a server with a reference URL of http://www.domain2.com, may be considered to reside within a different domain named domain2.com.

While managing internet services across different domains may provide numerous benefits, it also may result in difficulty tracking a same user's activities across the different domains. A typical mechanism employed in tracking a user's activities, cookies (or cookies), often provides only limited use across different domains. This is because access of such cookies may be properly restricted by the Internet protocol to access within the same internet domain and not across different internet domains. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 3 illustrates a conceptual diagram of one embodiment of Match-ID data;

DETAILED DESCRIPTION OF THE INVENTION

Figure 1:
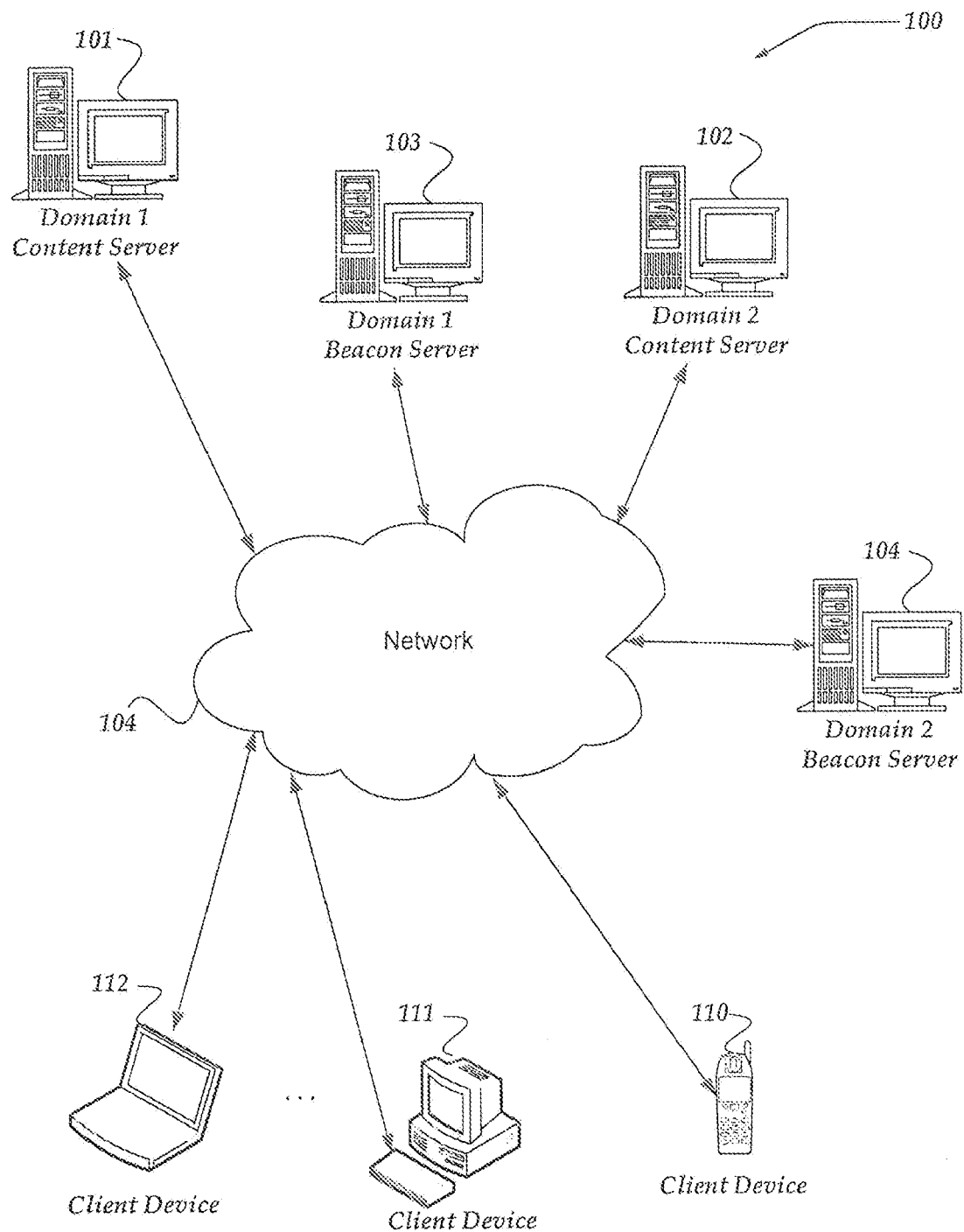
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term 'referrer' refers to an HTTP referrer field as described in Request for Comments (RFC) 2616, available through the Internet Engineering Task Force (IETF), and which is hereby incorporated by reference. It is noted that 'referrer' is sometimes misspelled as 'referer.' References herein, however, employ a corrected spelling, of 'referrer.'

HTTP cookies are described in RFC 2109, available at through the World Wide Web Consortium (W3C), and which is incorporated herein by reference. As used herein, the term "cookie" refers to information that gets passed from a server to a client, and passed back by the client and substantially conforms to the descriptions of cookies in the above RFC. Such information may be passed in both directions in an HTTP header. A cookie generally includes a name-value pair, and the term cookie may refer to the value, the name, or the combination of both, or a part of the combination. As used herein, a server may send the client a cookie, and the client may return the cookie it received, and both the sent and returned information is considered to be the same cookie.

Briefly stated the present invention is directed towards managing and tracking of cross-domain user activities through use of a beacon. When a user of a client device on a network requests content from different domain services managed by a common entity, they may receive a Uniform Resource Locator (URL) to a beacon in at least one of the different other domains. For example, a user may request content from a first content server within a first domain, and later content from a second content server within a second domain. The second content server may include with the requested content, the URL to a beacon. In one embodiment, the URL is to a server within the first domain. However, in another embodiment, multiple URLs may be includes to beacons obtainable from multiple other domains.

In one embodiment, the beacon is a small image, such as, for,example, a single pixel image. However, in another embodiment, the beacon may include text, such as a symbol, a dot, or the like. The second content server may also provide the client device a cookie for the second domain, and a Match-ID. In one embodiment, the Match-ID includes information that is directed towards uniquely identifying the client device and/or actions with the second content server. In one embodiment, the information is provided within a data packet. In one embodiment, a beacon server in one of the other domains, for example, the first domain, may receive the request for the beacon, and store in a domain log the Match-ID, as well as other information about the client device, and/or the client device's actions, such as which domain service provided the URL, or the like. The first content server may, in one embodiment, also employ the Match-ID, and/or other information about the client device's first domain actions to annotate its log. Moreover, where multiple other domains receive requests for beacons, associated logs for those domains might also be annotated using the Match-ID and/or other information. The different domain logs may then be employed for use in searching for matching Match-IDs, joining common user or client device activities, and for tracking other cross-domain client device or user activities.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area network 104, Content Servers 101-102, Beacon Servers 103-104, and client devices 110-112. As shown, content server 101 and beacon server 103 reside within domain 1, while content server 102 and beacon server 104 reside within domain 2. Although not shown, for clarity reasons, other content servers and/or beacon servers may be employed across a plurality of other domains, 3-*n*.

Client devices 110-112 may include virtually any computing device capable of receiving and sending a message over a network, such as network 104, to and from another computing device, such as content servers 101-102, beacon servers 103-104, each other, or the like. The set of such devices generally includes mobile devices that are usually considered more specialized devices with limited capabilities and typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. However, the set of such devices may also include devices that are usually considered more general purpose devices and typically connect using a wired communications medium at one or more fixed location such as laptop computers, desktops, and the like. Similarly, client devices 110-112 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 110-112 may include a user interface that enables a user to control settings, and to instruct the client device to perform operations. Each client device may also include a client user agent that enables the client device to send and receive messages to/from another computing device employing the same or a different communication means, including, but not limited to SMS, MMS, IM, internet relay chat (IRC), Mardam-Bey's internet relay chat (mIRC), Jabber, email, and the like.

Client devices 110-112 may be further configured with a browser application that is configured to receive and to send content in a variety of forms, including, but not limited to markup pages, web-based messages, audio files, graphical files, file downloads, applets, scripts, cookies, and the like. The browser application may be configured to receive and display graphics, text, multimedia, and the like, employing virtually any mobile markup based language or Wireless Application Protocol (WAP), including, but not limited to a Handheld Device Markup Language (HDML), such as Wireless Markup Language (WML), WMLScript, JavaScript, Standard Generalized Markup Language (SGML), Hyper-Text Markup Language (HTML), Extensible Markup Language (XML), EXtensible HTML (XHTML), or the like. In one embodiment, the browser application is an example, of a user agent.

Because each client device within client devices 110-112 may vary in size, shape, and capabilities, client devices 110-112 may also be configured to provide device profile information about its capabilities including whether the client device is capable of receiving particular types of audio files, graphical files, web-based files, and the like. Client devices 110-112 may also provide device profile information that may include an available application on the client device, version information, and other information about the device. In one embodiment, such information may include information such as the client device's network protocol capabilities. Various client applications may employ different network protocols. Thus, in one embodiment, a mobile device profile can also be used to obtain a mobile client's user agent capabilities. For example, a user agent capability may be obtained based, in part, on information in a standardized user agent profile, such as that defined by the User Agent Profile Specification available from the Wireless Application Protocol Forum, Ltd., Composite Capability/Preference Profiles (CC/PP), defined by the World Wide Web Consortium, or the like.

Client devices 110-112 may also provide an identifier. The identifier may employ any of a variety of mechanisms, including a device model number, a carrier identifier, a mobile identification number (MIN), and the like. The MIN is often a telephone number, a Mobile Subscriber Integrated Services Digital Network (MS-ISDN), an electronic serial number (ESN), Internet Protocol (IP) address, or other device identifier. In one embodiment, the identifier, and the device profile information is sent with each message to another computing device. However, the invention is not so limited, and the identifier and device profile information may be sent based on a request for such information, an event, or so forth.

Network 104 is configured to couple one computing device to another computing device to enable them to communicate. Network 104 is enabled to employ any form of medium for communicating information from one electronic device to another. Also, network 104 may include a wireless interface, such as a cellular network interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 104 includes any communication method by which information may travel between client devices 110-112, content servers 101-102, and/or beacon servers 103-104. Network 104 is constructed for use with various communication protocols including wireless application protocol (WAP), transmission control protocol/internet protocol (TCP/IP), code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

Content servers 101-102 include virtually any network device that may be configured to provide content over a network. In one embodiment, content servers 101-102 are configured to operate as a web site server. Thus, in one embodiment, content servers 101-102 may provide access to content using a domain name. As shown, content server 101 may reside within a different domain than content server 102. Content servers 101-102 are not limited to web servers, however, and may also operate as a messaging server, a File Transfer Protocol (FTP) server, a database server, application server, or the like. Moreover, while content servers 101-102 may operate as other than a website, they may still be enabled to receive and/or send an HTTP communication. Although not illustrated, multiple content servers may reside within a same domain, without departing from the scope of the invention.

In one embodiment, content servers 101-102 may also be configured to provide a link, such as a URL, Uniform Resource Identifier (URI), Uniform Resource Name (URN), or other network reference, to a beacon obtainable in a domain different from the domain in which the providing content server resides. Thus, for example, content server 101, which resides within domain 1, may provide a link to a beacon accessible from a server within domain 2, such as beacon server 104, or the like. Similarly, content server 102, which is shown to reside within domain 2, may provide a link to beacon server 103, which resides within domain 1. However, the invention is not so constrained, and where there are more than two domains, content servers 101-102 may also provide multiple requests for beacons, each request being to a different server within at least one of the other domains.

The beacon may be a file, document, or the like. In one embodiment, the beacon may include a single pixel sized image. However, the beacon may include virtually any defined sized image, including 2 pixels, or the like. Moreover, the beacon may include text, a video, an audio clip, or the like. The intent of the beacon is to enable communications of an identifier and/or other information to a network device within another internet domain while seeking to minimize the impact to the requesting client device. Thus, in one embodiment, the beacon may be arranged and configured to inhibit redirection of a current web page displayed at the requesting device to another web page.

In one embodiment, the beacon may be digitally signed and/or encrypted. The digital encryption and/or signature may be performed using any of a variety of encryption mechanisms.

In addition, content servers 101-102 may also be configured to determine an identifier that may be employed to uniquely identify and track activities of a visiting client device, such as client devices 110-112, or the like. One embodiment, of a Match-ID useable as a unique identifier is described in more detail below in conjunction with FIG. 3. Briefly, the identifier may include information about the visiting client device, processes on one of content server 101-102 employed to service a request from the visiting client device, a time of a visit, other actions, or the like. Moreover, in one embodiment, the providing content server of content servers 101-102 may further provide a client device with a cookie for the domain in which the providing content server resides.

Content servers 101-102 may also be configured to revise their network activity logs (and/or other tracking logs) with the Match-ID, cookies, and/or information about activities of the visiting client device.

Devices that may operate as content servers 101-102 include personal computers desktop computers, multiprocessor systems, microprocessor-based or programmable consumer electronics, network PCs, network appliances, servers, and the like.

Beacon servers 103-104 include virtually any network device that may be configured to provide a beacon in response to a request from another network device, such as client devices 110-112, or the like. In one embodiment, beacon servers 103-104 may receive a cookie from the requesting client device, where the cookie is associated with a same domain as the beacon server. Thus, for example, where a client device has a cookie from domain 1, the client device may provide the cookie to beacon server 103 (or even to content server 101).

In one embodiment, beacon servers 103-104 may examine a referrer field in a HyperText Transfer Protocol (HTTP) record, or the like, to determine from where the beacon request originated. In one embodiment, beacon servers 103-104 may receive a tag, or other information associated with the request for the beacon that may include information uniquely identifying the originating webpage, domain, or the like. For example, in one embodiment, the URL may include a tag, or other encoded information indicating where the beacon request originated. For example, in one embodiment, beacon servers 103-104 may receive the Match-ID within the link, tag, or the like.

Beacon servers 103-104 may employ the Match-ID to annotate an activity log for its associated domain. In one embodiment, beacon servers 103-104 may provide the Match-ID, and/or other information, to its respective content server (i.e., that content server within its same domain). In that embodiment, the respective content server may then annotate its activity log with the Match-ID for activities performed by the visiting client device. In one embodiment, beacon servers 103-104 may provide a respective cookie to the respective content server for further annotation and/or tracking. Thus, for example, in one embodiment, beacon servers 103-104 may receive a cookie from the beacon requesting client device, where the cookie is associated with the beacon's domain. Beacon server 103-104 may further provide the cookie, and/or the Match-ID to a respective content server within its domain, such that the respective content server may employ the cookie to locate information about the beacon requesting client device within its activity log, and employ the Match-ID, and/or other received information, to annotate its activity log. In this manner, where the beacon requesting client device has visited multiple domains, cross-domain information may be shared.

Devices that may operate as beacon servers 103-104 include personal computers desktop computers, multiprocessor systems, microprocessor-based or programmable consumer electronics, network PCs, network appliances, servers, and the like.

Although FIG. 1 illustrates beacon servers 103-104 as distinct from content servers 101-102, the invention is not so limited. For example, beacon server 103 and content server 101 may be implemented with a single computing device, such as described below in conjunction with FIG. 2. Similarly, beacon server 104 and content server 102 may be implemented with a single computing device. In one embodiment, functions of beacon servers 103-104 as distinct from content servers 101-102 may also be distributed across more than two computing devices, without departing from the scope of the invention. In still another embodiment, beacon servers 103-104 may reside within a single network device, such that domain 1 and domain 2 requests might be directed to the respective beacon server through appropriate network routing protocol mechanisms.

Illustrative Network Device

Figure 2:
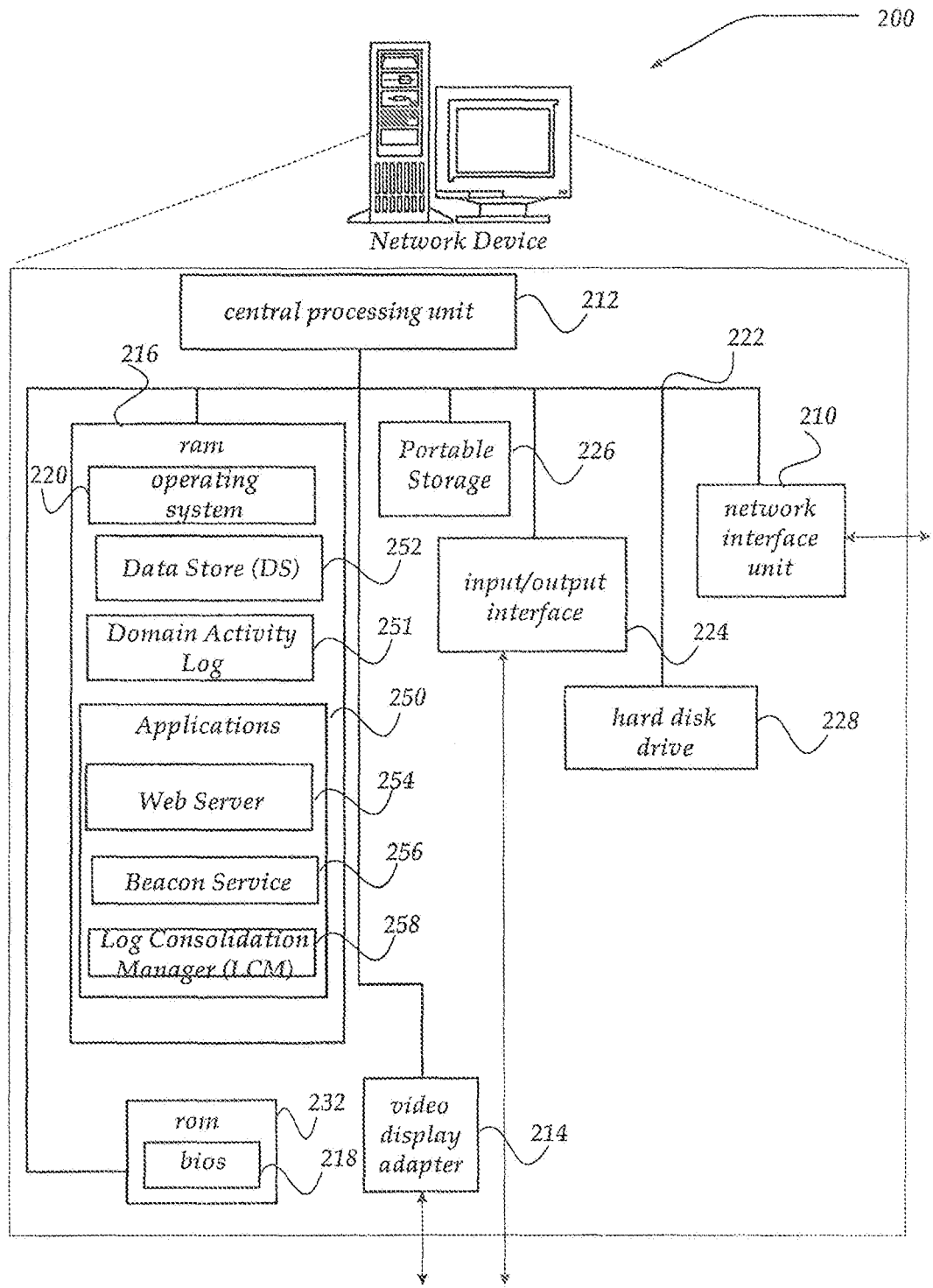
FIG. 2 shows one embodiment of a network device that may be included in a system implementing the invention.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, a combined content server and beacon server, such as content server 101 and beacon server 103, and/or content server 102 and beacon server 104 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, or the like. Mass memory storage may also include portable storage 226 devices, such as tape drive, optical drive, removable flash memory storage devices, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, calendars, database programs, word processing programs, messaging programs, HTTP/HTTPS programs, customizable user interface programs, IPSec applications, encryption programs, security programs, FTP servers, and so forth. Web server 254, beacon service 256, and log consolidation manager (LCM) 258 may also be included as application programs within applications 250. In addition, mass memory may also include data store (DS) 252 and domain activity log 251.

Data Store (DS) 252 stores a plurality of content, or the like, useable by web server 254 to respond to a request by another network device, such as a client device, or the like. In one embodiment, DS 252 may be a database, a file structure, or the like. DS 252 may store the content for ease of access by a requestor and/or request type. Thus, for example, DS 252 may store the content based on whether it is a file, a web page, a document, an image, or data formats. Moreover, the content may be stored based on whether it is a web request, an FTP request, or the like. In one embodiment the content may be configured and stored based on whether the request is from a mobile device, whether the request is over a high speed or low speed data connection type, or the like. In one embodiment, the content may be stored in an HTML format, a java script format, as an applet, or the like. In one embodiment, the content may be a web page that includes a link to a beacon in another domain than the domain in which network device 200 resides.

Domain Activity Log 251 is configured to receive and manage information associated with activities, actions, requests, responses, or the like by and/or for a visiting network device. Thus, in one embodiment domain activity log 251 may record what content was requested, and/or provided to a visiting network device, when the request was received, and/or a variety of other information, including security information, information about the visiting network device, or the like. In one embodiment, domain activity log 251 may employ a cookie to assist in obtaining and providing activity information about the visiting network device.

Web server 254 represents virtually any software that may be configured to manage requests for content from a web browser application. Web server 254 may deliver HTML documents, files, or other web page content from DS 252 in response to the request by the web browser application. In one embodiment, web server 254 may execute server-side scripts, including CGI scripts, JSPs, ASPs, or the like, that are configured to provide functions, including database searching, formatting, forms, or the like. In one embodiment, web server 254 may be further configured to insert a link, such as a URL, a tag, or the like, into content that is provided to the requesting web browser application. In one embodiment, the link, URL, tag, or the like, may include a request for a beacon accessible from a server that resides in a different domain than that of web server 254.

In addition, web server 254 may provide a cookie to a visiting network device, useable in tracking behaviors, and/or other activities, and/or other information about the visiting network device. Web server 254 may also request and/or receive the cookie from a network device that has previously visited the web server 254, and/or another server within the same domain as web server 254.

In one embodiment, web server 254 may further generate a unique identifier such as a Match-ID (described below) for use in tracking cross-domain activities by a visiting network device. Web server 254 may provide the Match-ID as part of the link to the beacon, within a tag, or the like. Moreover, web server 254 may also employ the Match-ID to annotate domain activity log 251 for activities, and/or other information associated with eh visiting network device.

Although beacon service 256 is illustrated as residing within network device 200, as mentioned above in conjunction with FIG. 1, the invention is not so constrained, and beacon service 256 may also reside within a different network device than web server 254, but within a same domain.

Figure 4:
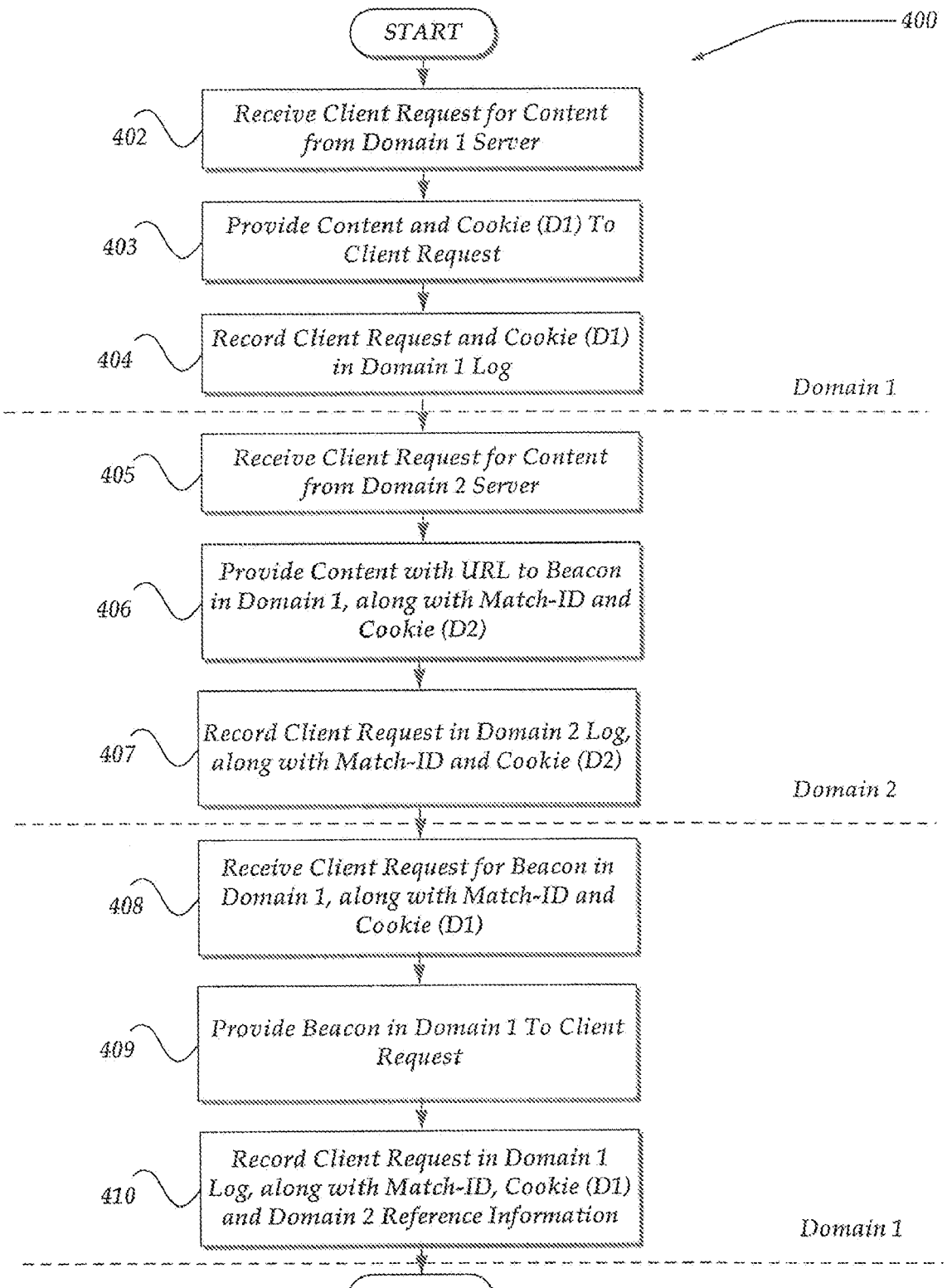
FIG. 4 illustrates a logical flow diagram generally showing one embodiment of an overview process for managing and tracking of cross-domain user activities through use of a beacon.

In any event, beacon server 256 is configured to respond to a request for a beacon from another network device. In addition, beacon server 256 may also be configured to determine a source of the requesting other network device using any of a variety of mechanisms, including a referrer field, a tag, a characteristic of the requester's link, or the like. In one embodiment, beacon server 256 may also receive a Match-ID, or the like, as part of the request, and/or in addition to the request. Beacon server 256 may further receive a cookie from the requesting device, where the cookie is associated to a same domain in which beacon server 256 resides. In one embodiment, beacon server 256 may provide information about the Match-ID, cookie, or the like, to web server 254 for use in annotating domain activity log 251. In another embodiment, beacon server 256 may also employ the Match-ID, cookie, and other information, to annotate its own log, domain activity log 251, or the like. Process 400 of FIG. 4 provides one embodiment, of an example flow for employing Match-IDs to track cross-domain activities of a visiting network device.

Although the above illustrates use of web services to track and service network requests, and provide cross-domain information such as Match-IDs, or the like, the invention is not so limited. Any of a variety of other network services may also be employed, including, for example, FTP services, messaging services, or the like, without departing from the scope of the invention.

Log consolidation manager (LCM) 258 is configured to manage cross-domain activity log consolidation information. Thus, in one embodiment, LCM 258 may reside within network device 200, or even a different network device. LCM 258 may be configured to operate in an off-line configuration accessing activity logs from across multiple domains that may be commonly managed. However, LCM 258 may also request access to, and/or a copy of activity logs from across Various services within different domains in real-time, while the activity logs are still employed, or the like, without departing from the scope of the invention.

LCM 258 may request access to, or a copy of, the various activity logs. LCM 258 may then employ a process such as described below in conjunction with FIG. 5 to search the activity logs for matching Match-IDs. LCM 258 may join, merge, or otherwise combine information based on the matched Match-IDs, and further perform analysis of the combined and/or uncombined information within the activity logs to analysis cross-domain (and/or non-cross domain) activities of visiting network devices.

Illustrative Identifier

FIG. 3 illustrates a conceptual diagram of one embodiment of Match-ID data useable as a unique identifier for tracking cross-domain activities of a network device. As shown in FIG. 3, Match-ID 300 may include a range of bytes 302 that may represent various named information 304, such as described in description 306. As shown, the Match-ID is illustrated as 18 bytes in length, however, the invention is not so constrained, and any of a variety of other byte lengths, and/or arrangements, may also be employed, without departing from the scope of the invention. Moreover, different information may also be included within Match-ID 300, including information obtained from the visiting client device, such as device identifier, a user name, user account, or the like.

However, as shown, in one embodiment, bytes 311 may represent a version identifier for the Match-ID 300, for an associated Log Consolation Manager, or the like. Bytes 312 may represent information about a server network Address, such as an Internet Protocol (IP) address, or the like, associated with a server responding to a request from a visiting network device. Bytes 313 may represent a time stamp, or the like, indicating a starting time, time a request is received, or the like. Bytes 314 may represent a process ID for a server process servicing the request from the visiting network device. Thus, in one embodiment, bytes 314 may represent a process ID associated with web server 254 of network device 200 of FIG. 2. Bytes 315 may represent a unique sequence number, or other value, useable to uniquely identify the visiting network device. In one embodiment, bytes 315 may represent a monotonically increasing sequence number for each process ID identified by bytes 314. In one embodiment, the sequence number may wrap after some value, however, combined with other invention in Match-ID 300, Match-ID 300 may be considered to be unique to a visiting client device, within some time period. Moreover, bytes 316 may represent a web page, template ID, or other content requested by the visiting client device.

Match-ID 300 may also be encrypted, and/or compressed, using any of a variety of encryption and/or compression mechanisms. In one embodiment, Match-ID 300 may also be digitally signed using any of a variety of digital signature mechanisms.

Generalized Operation

The operation of certain aspects of the invention will now be described with respect to FIG. 4-5. FIG. 4 illustrates a logical flow diagram generally showing one embodiment of an overview process for managing and tracking of cross-domain activities through use of a beacon. Process 400 of FIG. 4 may be implemented within a plurality of different network devices, across multiple domains. Thus, for example, in one embodiment, blocks 402-404 and/or blocks 408-410 may be implemented within one or more network devices within domain 1, while blocks 405-407 may be implemented within one or more network devices within domain 2. However, it should be clear that these blocks are not constrained to these domains, and different network devices in different domains may also be employed, without departing from the scope of the invention. However, for sake of clarity, two domains (domains 1 and 2) are illustrated.

As shown, process 400 begins after a start block, at block 402, where a client request is received for content from a domain 1 content server. Processing proceeds to block 402, where a response that may include the content is provided to the request. In addition, in one embodiment, a cookie for domain 1 (Cookie D1) may also be provided to the client request.

Processing may then proceed to block 404, where information about the client request, the client device, a user of the client device, activities associated with the user and/or client device, may be recorded in a domain 1 activity log. It should be clear that any of a variety of tracking information may be recorded within the domain 1 activity log. In one embodiment, the Cookie D1 may also be logged into the domain 1 activity log.

Processing then proceeds to block 405 where the same client device may be employed to browse for content from a domain content server in a different domain than the domain 1 content server of blocks 402-404. In one embodiment, the different domain is illustrated as domain 2; however, any other different domain may be employed.

In any event, processing flows next to block 406, where the domain 2 content server provides content in response to the client request. In one embodiment, the domain 2 content server may also provide a cookie (D2). The domain 2 content server may include within the provided content, or in addition to the provided content, at least one link, such as a URL, or the like, to a beacon, where the beacon is to at least one beacon server, or the like, within a domain other than domain 2. As illustrated, the beacon may be to a beacon server within domain 1. However, the invention is not so limited. For example, in one embodiment, a plurality of links may be provided to the client request, where each of the plurality of links are to different beacons, each beacon being in a different domain other than domain 2. Thus, in one example, domain 2 content server may provide a request for a beacon in domains 1, 3, 4 . . . domain n, without departing from the scope of the invention.

Along with the link to the beacon, domain 2 content server may also determine and provide a Match-ID, or other unique identifier, as described above. Processing then proceeds to block 407, where the domain 2 content server may employ the cookie D2, Match-ID, and/or other information to annotate its domain 2 activity log.

Processing continues to block 408, where the client device may employ the link to the beacon server to request the beacon. In one embodiment, as illustrated, a single beacon request may be employed. However, the invention is not so limited, and blocks 408-410 may be repeated for a plurality of different domains. In any event, the client request may also include a cookie D1, if it has it available, along with the Match-ID, to the beacon server. In one embodiment, the beacon server may also determine a source of the request, using a referrer field in an HTTP access record, a tag associated with the link, or the like.

Processing then flows to block 409, where a beacon may be provided to the requesting client device. As stated above, the beacon may include, in one embodiment, a small image, such as a one pixel image, or the like.

Processing continues to block 410, where the beacon server within domain 1 may employ the Match-ID, cookie D1, and/or other information to annotate its domain 1 activity log. In one embodiment, the beacon server may also provide information, including the Match-ID, cookie D1, or the like, to a domain 1 content server, which may then use the received information to annotate its domain 1 activity log. Processing may then return to a calling process to perform other actions.

Figure 5:
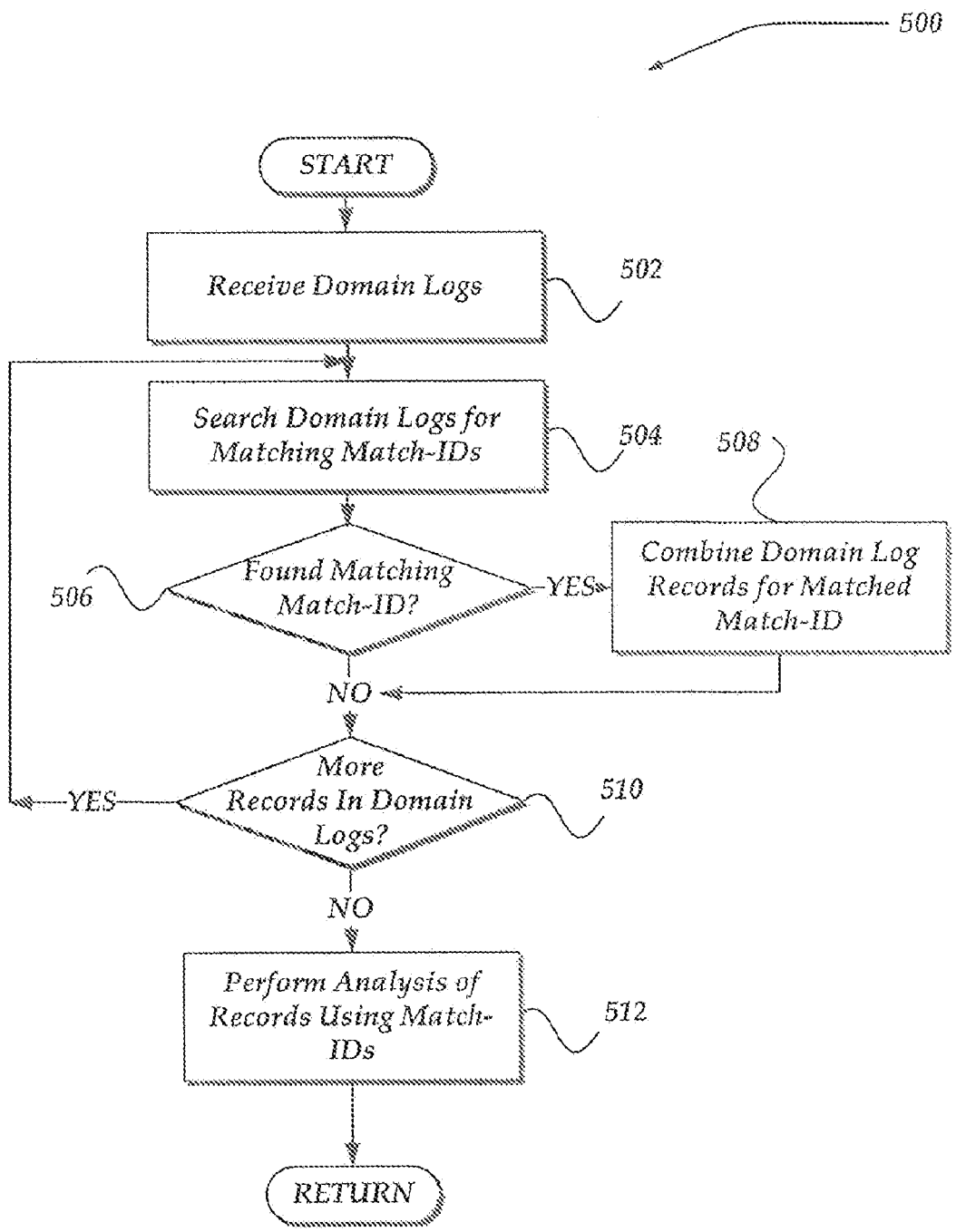
FIG. 5 illustrates a logical flow diagram generally showing one embodiment of a process for employing Match-ID data in domain logs to enable analysis of cross-domain user activities, in accordance with the present invention.

FIG. 5 illustrates a logical flow diagram generally showing one embodiment of a process for employing Match-ID data in domain activity logs to enable analysis of cross-domain user activities, in accordance with the present invention. Process 500 of FIG. 5 may be implemented within a Log Consolidation Manager, such as LCM 258 of FIG. 2. However, the invention is not so limited, and other applications may also be used to perform process 500, including for example, a beacon server application or the like.

In any event, process 500 begins, after a start block, at block 502, where domain logs from a plurality of different domains are received. In one embodiment, the domain activity logs may be obtained from various content servers within and across different domains. It should be noted, that where there are multiple content servers within a same domain, those domain logs may also be accessed and analyzed.

Processing continues to block 504, where each domain activity log is searched for Match-IDs. When a Match-ID is located in one domain activity log, the other domain activity logs are also searched to find a matching Match-ID. Processing flows next to decision block 506 where a determination is made whether matching Match-IDs are found in multiple domain activity logs. Matching Match-IDs indicate that the same client device and/or user visited content servers in different domains. Thus, if a match is found, processing flows to block 508; otherwise, processing flows to decision block 510.

At block 508, the records associated with the matching Match-ID may then be combined, joined, or otherwise associated such that they may be conveniently located, and analyzed. In one embodiment, the information within each domain activity log with the matching Match-ID may be joined and moved to a different location, such as a different log, table, file, or the like. Processing moves then to decision block 510.

At decision block 510, a determination is made whether there are any more records within the domain activity logs with un-matching (or even no) Match-IDs. If there are more records to examine, processing loops back to block 504 to continue searching until all possible cross-domain matches have been located. Otherwise, processing flows to block 512.

At block 512, any of a variety of analysis may be performed on the resulting uncombined (un-matching) records and/or the combined (matching) records. Such performance analysis may include, for example, an analysis of how many client devices, users, or the like, cross domains, and/or why. How many unique visitors visited each of the content servers. Clearly, other analysis may be performed, and the above are provided merely as examples, and are not intended to be limiting, in any manner. In any event, processing may then return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device configured within a first internet domain and useable in tracking activity over a network, comprising:
   a transceiver to send and receive data over a network; and
   at least one processor that is operative to perform actions, comprising:
      receiving from a client device a request for content over the network;
      providing the client device with a link to a beacon, wherein the link is to another network device within a second interne domain that is different from the first internet domain, and wherein the client device sends a request for the beacon to the other network device such that the other network device identifies at least one cross-domain activity by the client device.

2. The network device of claim 1, wherein providing the client device with the link further comprises providing the other network device with information that is used by the other network device to determine a source of the link within the first internet domain.

3. The network device of claim 1, wherein the beacon further comprises an image.

4. The network device of claim 1, wherein the at least one processor is configured to perform actions, further including:
   receiving from another client device another request for content over the network; and
   providing the other client with a plurality of links, each link being to a different beacon each located within internet domains that are different from the first internet domain, such that additional network devices in the different internet domains can identify additional cross-domain activities by the other client device.

5. The network device of claim 1, wherein providing the client device with the link to a beacon, further comprises, providing the client device with a plurality of links, each link being to a different beacon, each beacon obtainable from a different network device within a different internet domain than each other network device and from the first internet domain.

6. The network device of claim 1, wherein the other network device further receives a referrer field in an HTTP access record useable to determine which site within the second internet domain the client device visited.

7. A system, comprising:
   a first domain network device within a first internet domain that performs actions, including:
      receiving a request for content from a client device over the network;
      providing to the client device a link to a beacon obtainable from within a second internet domain that is different from the first internet domain; and
   a beacon service network device that is within the second internet domain that performs actions, including:
      receiving the request to the beacon; and
      employing, in part, information associated with the request to identify cross-domain activities performed by the client device.

8. The system of claim 7, further comprising:
   a log consolidation component within at least one other network device that is configured to perform actions, including:
      receiving a first internet domain log and a second internet domain log;
      searching for a match of information about the client device within the internet domain logs; and
      if a match is found, joining log information associated with the client device from the first internet domain log and the second internet domain log to identify cross-domain activities performed by the client device.

9. The system medium of claim 7, wherein the first domain network device is configured to perform actions, including: providing a cookie to the client device in response to the request for content.

10. The system medium of claim 7, wherein the information associated with the request further comprises a computer-readable structure having:
    a first data storage field comprising a time stamp indicating a time of the request for content;
    a second data storage field comprising an identifier of the first domain network device; and
    a third data storage field comprising an identifier that uniquely identifies the client device.

11. The system medium of claim 7, wherein providing to the client device the link further comprises providing a Match-ID, and wherein receiving the request to the beacon further comprise receiving the Match-ID, the Match-ID comprising the information associated with the request to identify cross-domain activities.

12. The system of claim 11, wherein the Match-ID further comprises at least one of a sequence number associated with a server process, a client identifier, or a server process identifier.

13. The system medium of claim 11, wherein the Match-ID is further useable to locate cross-domain activities by the client device within a plurality of different log files.

14. A non-transitory computer-readable storage medium having stored thereon computer-executable instructions that when installed into a computer device causes the computer device to perform actions, comprising: receiving from a client device a request for content over the network at the computer device, wherein the computer device is within a first internet domain; and providing the client device with a link to a beacon, wherein the link is to another computer device that is within a second internet domain that is different from the first internet domain, and wherein the client device sends a request for the beacon to the other computer device such that the other computer device is enabled to employ information association with the beacon to determine at least one cross-domain activity by the client device.

15. The non-transitory computer-readable storage medium of claim 14, further comprising: providing a plurality of other links to the client device, wherein each link in the plurality of other links is useable to request a beacon obtainable from another computer device within one of a plurality of different internet domains, each of the plurality of different internet domains being different from the first or the second internet domain.

16. The non-transitory computer-readable storage medium of claim 14, wherein providing the link to the beacon further includes providing a Match-ID that is useable to locate information about cross-domain activities of the client device.

17. The non-transitory computer-readable storage medium of claim 16, wherein the Match-ID comprises a computer-readable storage structure storable on a network device, and having: a first data storage field comprising a time stamp indicating a time of the request for the content; and at least one other data storage field comprising an identifier of first domain computer device.

18. The non-transitory computer-readable storage medium of claim 14, wherein providing the client device with the link further comprises providing the other computer device with information that is used by the other computer device to determine a source of the link within the first internet domain.

19. The non-transitory computer-readable storage medium of claim 14, wherein the beacon further comprises an image file.

20. The non-transitory computer-readable storage medium of claim 14, wherein the other computer device further receives a referrer field in an HTTP access record useable to determine which site within a second internet domain the client device visited.

* * * * *

UNITED STATES PATENT AND TRADEMARK OFFICE
CERTIFICATE OF CORRECTION

PATENT NO.        : 8,200,816 B2
APPLICATION NO.   : 13/217085
DATED             : June 12, 2012
INVENTOR(S)       : Yury A. Izrailevsky et al.

Page 1 of 1

It is certified that error appears in the above-identified patent and that said Letters Patent is hereby corrected as shown below:

In column 13, line 52, in Claim 1, delete "interne" and insert -- internet --, therefor.

Signed and Sealed this
Seventh Day of August, 2012

David J. Kappos
*Director of the United States Patent and Trademark Office*